No. 840,013. PATENTED JAN. 1, 1907.
J. L. ROUTIN.
CONTROLLING ELECTRIC POWER DISTRIBUTING SYSTEMS.
APPLICATION FILED SEPT. 2, 1904.
4 SHEETS—SHEET 2.
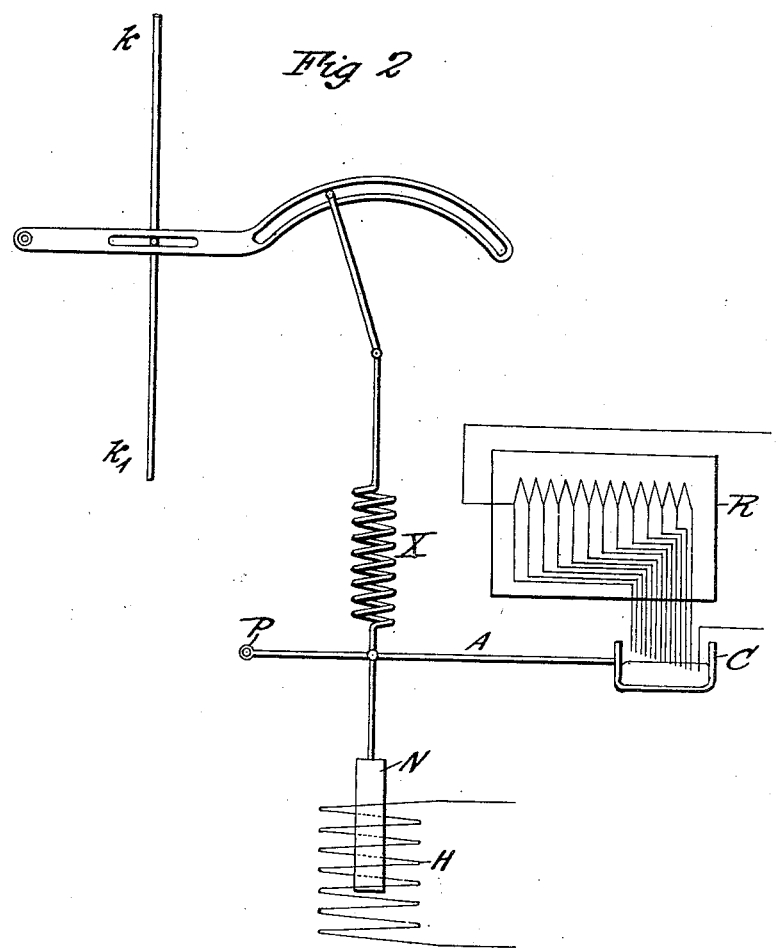

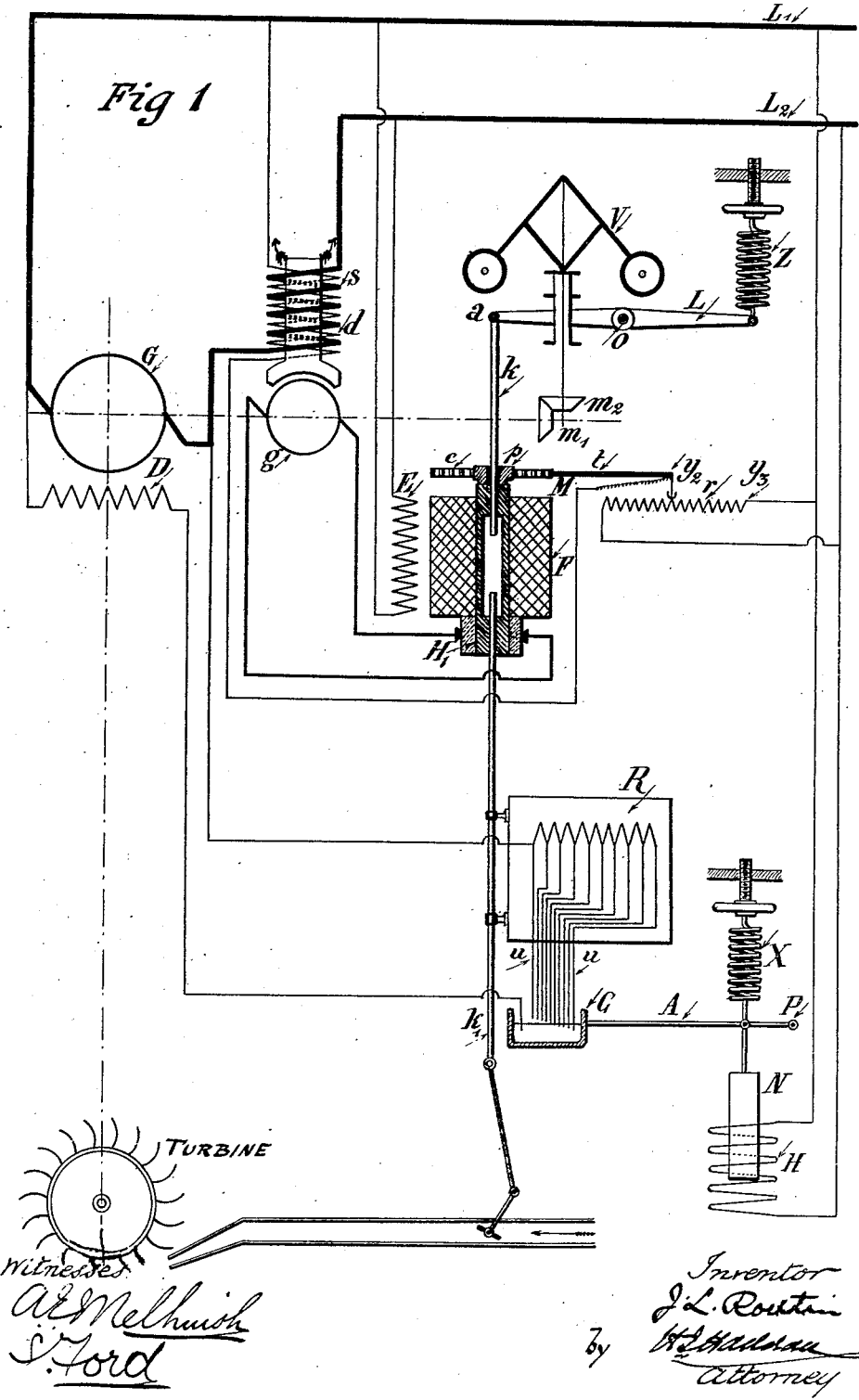

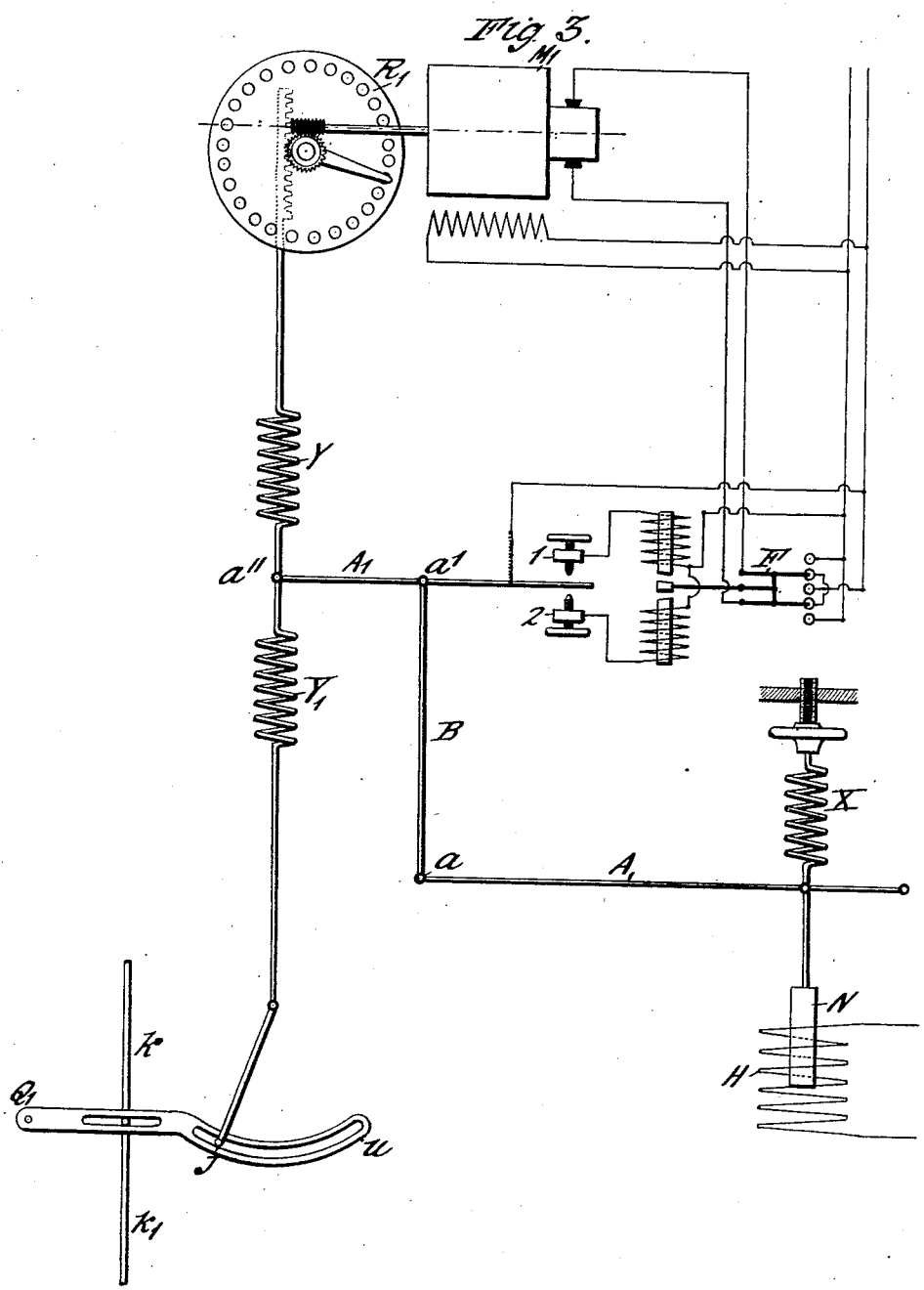

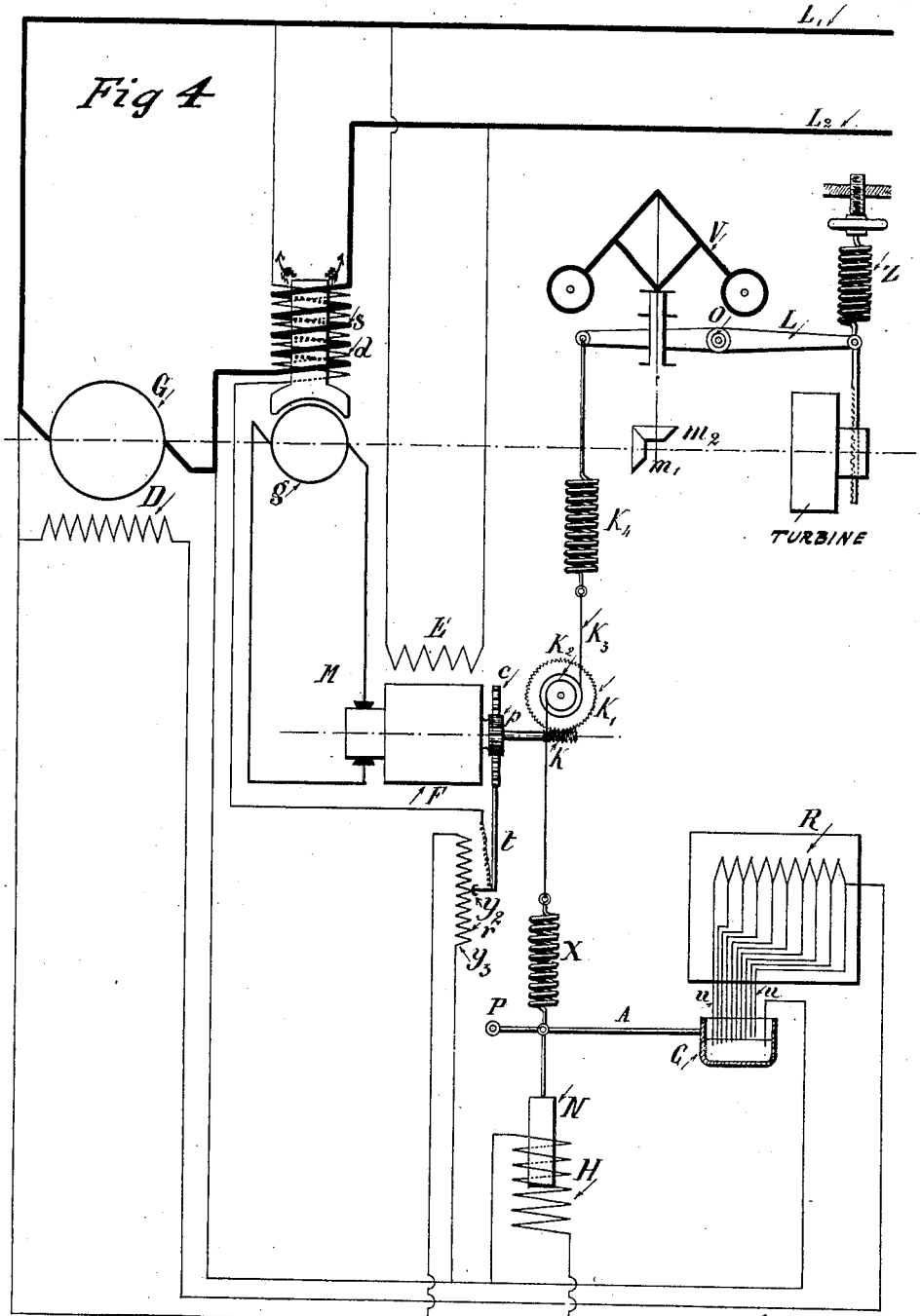

UNITED STATES PATENT OFFICE.

JOSEPH LOUIS ROUTIN, OF LYON, FRANCE.

CONTROLLING ELECTRIC-POWER-DISTRIBUTING SYSTEMS.

No. 840,013.  Specification of Letters Patent.  Patented Jan. 1, 1907.

Application filed September 2, 1904. Serial No. 223,159.

*To all whom it may concern:*

Be it known that I, JOSEPH LOUIS ROUTIN, a citizen of the French Republic, residing at Lyon, France, have invented certain new and useful Improvements in Controlling Electric - Power - Distributing Systems, of which the following is a specification.

The present invention relates to improvements and means for controlling electrical power-distributing systems.

In order to give a general view of the invention, the following description will deal, by way of example, with the most complicated case in which both the tension and the speed at which the generator is run have to be kept constant.

In Figure 1 of the annexed drawings this is illustrated in connection with a continuous-current dynamo, G representing the generator, D the exciting-circuit thereof, and R a rheostat in the said circuit. Figs. 2 to 4 illustrate modifications of the mechanism. Fig. 3 illustrates a further modification in which the control of the prime mover is obtained through a servo-motor. Fig. 4 illustrates a further modification of the apparatus.

In the apparatus illustrated in Fig. 1 the rheostat R is fixed to the rod $k\ k'$, which is adapted to move vertically downward when the load increases.

C is a small cup filled with mercury, into which the rods $u\ u$, connected with the terminals of the rheostat R, are adapted to be successively immersed in the known manner.

$L'$ and $L^2$ are the mains.

$g$ is the armature of a small auxiliary generator, the purpose of which will be explained hereinafter. This armature $g$ must be continuously revolved. In the drawings it is shown as being driven by the same engine as the armature of the principal dynamo G.

$s$ is a field-coil acting on the armature $g$ and carrying the main current. $d$ is a field-coil which also acts on the armature $g$, but through which flows a current varying in strength according to the position of the contact $y^2$ of the rheostat $r$. The magnetizing action of the coil $d$ is opposed to that of the coil $s$, this being indicated in the drawings by their entrances and exits being opposed to one another.

$r$ is a rheostat connected in parallel with the mains $L'$ and $L^2$ and allowing of feeding the coil $d$ with varying pressure. This rheostat $r$ is fixed to the frame of the motor M, the armature of the latter being fed by the armature $g$, whereas its field-magnet E is connected in parallel to the mains $L'$ and $L^2$.

The rotation of the armature F controls, on the one hand, the displacement of the rod $t$—for instance, by means of a pinion $p$ and rack $c$—and, on the other hand, produces the lengthening and shortening of the rod $k\ k'$, which is composed of two parts connected together by a sleeve $H'$. The latter, which is revolved by the armature F, is provided with two internal oppositely - directed screw-threads, which engage the ends of the parts $k\ k'$, respectively. The rod $t$ is adapted to move the contact $y^2$.

$v$ is a tachometrical governor, which can, for instance, be operated by centrifugal force.

L is the lever of the governor V, O the pivot of the said lever L, and Z a spring which opposes the centrifugal action of the governor V.

$m'$ and $m^2$ are two toothed wheels serving for driving the governor V.

H is a solenoid connected in parallel with the mains $L'$ and $L^2$ and acting on the core N, suspended from a lever A. This lever A oscillates about a fulcrum P.

X is a spring opposing the magnetic attraction.

The lever A carries the mercury-cup C of the rheostat R.

The rod $k\ k'$, pivoted at $a$, is supposed to act directly on a device or devices for controlling the engine, such as a turbine, which drives the electric generator.

When the dynamo is not under load, no current passes in the main $L^2$. Consequently there is no current in the coil S, which is inert. There is also no current in the coil $d$, because at this time the contact $y^2$ is at the point $y^3$, cutting out the resistances of the rheostat $r$, and both ends of the coil $d$ are directly connected to the same main $L'$. In this position of the contact $y^2$ and of the rod $t$ and rack $c$, which correspond thereto, the rods $k\ k'$ will be drawn together to the minimum length. The resistance of the rheostat R will then be at its maximum. With this resistance the pressure on open circuit is normal.

It will be seen that when there is no load-current no current passes in either of the coils $s$ or $d$, which act as field-coils of the auxiliary generator. The result is that the armature $g$ of the auxiliary generator then supplies no current to the armature F of the motor M. Assuming that a load is put on suddenly with a certain value, the current now produced in the coil $s$ at once produces an electromotive force on the terminals of the armature $g$, and the armature F of the motor M will begin to revolve, so as to cause an extension of the rod $k\ k'$, which by decreasing the resistance of rheostat R produces an increase of excitation of the dynamo and an increase in the supply of the driving fluid which operates the turbine or the like by which the dynamo is driven. The same rotation of the armature F causes, however, the displacement of the contact $y^2$ from $y^3$ toward the left, Fig. 1, so that the resistance of rheostat $r$ is increased and the coil $d$ receives current, which increases until the current in the coil $d$ is equal to that in the coil $s$. The currents in $s$ and $d$ being equal and opposite in direction thus neutralize one another, and the movement of parts $g\ F\ c\ t\ y^2\ k\ k'$ automatically ceases. If the elements of resistance of the rheostats R and $r$ have been suitably adjusted, the speed and tension can by this means be rendered perfectly constant.

If the elementary resistances have not been exactly adjusted, the tachometrical governor, on the one hand, and the voltmetrical governor, on the other hand, come into action to effect complementary correction. The tachometrical governor V operates in the known manner against the tension of spring Z to move the lever L, so as to lift the rod $k$ when the speed of the dynamo G rises above the normal. Since the rods $k\ k'$ and armature F act as one rod, this action causes increase of resistance in rheostat R, which reduces the excitation of the dynamo and the supply of the motive fluid. Fall of speed conversely permits the governor V to increase the excitation and supply of motive fluid. The governor V is driven by the beveled wheels $m'\ m^2$ from the shaft of the dynamo-armatures G and $g$. The voltmetrical governor constituted by the solenoid H also operates on increase or decrease of difference of potential between the mains $L'\ L^2$—that is to say, on increase of potential the core N is attracted against the tension of spring X and the lever A is drawn down so as to increase the resistance in the rheostat R, and consequently decrease the excitation of the dynamo, or on decrease of potential the core is not so strongly attracted and rises, and the lever A rises and decreases the resistance in the rheostat R so as to increase the excitation of the dynamo.

The object of retaining the tachometrical governor V and the voltmetrical governor H is to provide for greater delicacy of control than would be given by the step-by-step regulation of the rheostats R and $r$ and to compensate for possible inexactness of correspondence between these two rheostats. It will be observed that the voltmetrical governor acts only on rheostat R and that the tachometrical governor acts only on this rheostat and the supply of motive fluid. On the other hand, the object of employing the remainder of the means of regulation above described is to compensate for the known inexactness of regulation of the voltmetrical and tachometrical governors when applied alone—namely, that when under load they give a lower speed and voltage than when not under load. For the same reason it is quite practicable, if desired, to arrange the mechanism so that it over-corrects—that is to say, so that it will give a higher tension when under load than when not under load. If this is desired, as it sometimes is, it is only necessary to so calculate the elements of resistance of the rheostat R so that it over-excites the generator in proportion as its resistance decreases and the intended excitation of the dynamo is to be increased.

Any reduction of load causes the coil $s$ to become weaker and allows the coil $d$ to become preponderatingly effective, and thus immediately produces at the terminals of the armature $g$ an electromotive force of opposite direction to that caused by the increase of the load. The motor M will therefore reduce the admission of motive fluid to the engine and the excitation of the electric generator, so as to maintain the desired speed and tension.

It may be mentioned that the use of the auxiliary generator allows of obtaining very great sensitiveness. It is sufficient for this purpose to construct the said auxiliary generator so that its magnetic circuit becomes rapidly saturated, for instance, with a main current equal to one-fifth of the maximum main current. The motor gives its normal torque when the tension of the auxiliary generator reaches a certain fraction (for instance, one-tenth) of its maximum value. With the values cited by way of example the motor will develop its normal torque with variations of one-fiftieth—that is to say, two per cent.—in the main current. It must also be noted that the rate of displacement of the regulating parts increases at the same rate as the variation of load by which the displacement is caused. Owing to the rapid saturation of the magnetic circuit of the auxiliary generator, all danger of deterioration of the armature is obviated.

In practice it will be more simple to make the rheostat R stationary and to cause the displacement of the part $k'$ of the rod $k\ k'$ to act on the tension of the spring X, the solenoid H being arranged in such a manner that small displacements of its core are without influence on the magnetic attraction. The conditions will obviously be the same as before. This construction is shown in Fig. 2. It will also be advantageous to arrange between the part $k'$ and the spring X a lever J with variable purchase, so as to allow of obtaining according to desire for each displacement of the part $k'$ a greater or less displacement of the free end of X, which will allow of increasing according to desire the tension with the load. An arrangement of this kind is also shown in Fig. 2.

In the case of an ordinary rheostat the solenoid H will be too weak to obtain direct action. It is then caused to act on relays, the arrangement being such that the result is the same as if the rheostat were directly operated. Fig. 3 also illustrates this. B is a rod pivoted at $a$ and $a'$, and A' is a lever controlling with one of its ends the relays 1 and 2, which serve to increase and decrease the excitation, respectively. The other end of the lever A' is pivotally connected at $a''$ to two springs $y$ and $y'$, acting in opposite directions. The tension of the spring $y$ is a function of the displacement of the rheostat and increases with the excitation. The spring $y'$ is connected to the rod $k\,k'$ and receives from the latter a varying displacement according to the position of the end of the connecting-rod J in the slot U of a lever pivoted at Q'. The tension of this spring varies with the displacement of the part, which insures the mechanical regulation and increases with the load. The tension of the counteracting spring X varies only with the displacement of N.

R' is the rheostat, and M' the motor controlling same. The rheostat R' is moved by the motor M'. The inductor of the latter is constantly excited, but the current in the armature may be interrupted or changed in direction by the action of the reversing-switch F'.

The object of the auxiliary generator is to effect the simultaneous regulation of the supply of motive fluid and the excitation of the electric generator, according to the value of the apparent resistance of the whole of the consuming apparatus fed by the mains L' L². The first regulation, which is effected according to the load without the necessity of any variation, even infinitesimal in the speed of the tension, may be called the "dynamometrical" regulation. It may be stated at once that this only occurs in case of variations in the apparent resistance on the mains and that it remains inactive in case of variations of speed or tension due to abnormal causes, such as, for instance, variations of the pressure of the motive fluid. It is for this reason that it is indispensable to provide for additional or complementary regulation. This additional regulation is obtained by means of the tachometrical governor and the device for controlling the tension. Independently of their ordinary purpose, which is to perfect under normal conditions the regulation of the speed and tension, the apparatus for this purpose can act separately in certain cases. Thus, for instance, the tachometrical governor obviates the dangers resulting from a breakage in the electric circuit, and the voltmetrical governor intervenes very usefully to momentarily compensate the fall of speed, which inevitably occurs in the case of a sudden increase of the load, when considerations of safety do not allow of sufficiently rapid operation of the sluice. In this case it is assumed that the motor M acts on the rod $k\,k'$. The length of the said rod or what is equivalent to said rod can, however, be kept constant, and the motor M can be used to exert, on the one hand, on one end of the lever L, and, on the other hand, on the spring X an amount of force which varies with the load. Mechanism so arranged is illustrated. For this purpose it is sufficient to mount on the axle of the motor M a tangential worm K, gearing with a wheel K', fixed to a drum K², on which a small chain K³ is wound, the said chain being attached to a spring K⁴, attached to one end of the lever L. This arrangement allows of making the motor M and the rheostat R stationary. The rod T, pivoted to the end of lever L, acts directly on the controlling organ of the prime mover. The system can be simplified according to the particular cases which have to be dealt with and according to the conditions under which regulation has to take place.

What I claim as my invention, and desire to secure by Letters Patent of the United States, is—

1. In means for regulating the speed and tension of an electric generating system, the combination with the main generator speed-governor and tension-regulator, of an auxiliary generator comprising an inductor carrying two oppositely-active windings, one of which is in series with the principal current, a tension-regulator for the other winding and a motor connected to be operated by the auxiliary generator and to operate the speed-governor and the two said tension-regulators.

2. In means for regulating the speed and tension in an electric generating system, the combination with a main generator, a rheostat in circuit with the field-coil thereof, an auxiliary generator having two mutually counteractive field-coils, one in circuit with the mains, the other in parallel therewith, a rheostat in said parallel circuit, and a motor electrically connected with said auxiliary generator and adapted to operate the two rheostats.

3. In means for regulating the speed and tension in an electric generating system, the combination with a main generator, a rheostat in circuit with the field-coil thereof, an auxiliary generator having two mutually counteractive field-coils, one in circuit with the mains, the other in parallel therewith, a rheostat in said parallel circuit, a motor electrically connected with said auxiliary generator and adapted to operate the two rheostats and means connecting the regulator of the prime mover to the motor.

4. In means for regulating the speed and tension in an electric generating system, the combination with a main generator, a rheostat in circuit with the field-coil thereof, an auxiliary generator having two mutually counteractive field-coils, one in circuit with the mains, the other in parallel therewith, a rheostat in said parallel circuit, a motor electrically connected with said auxiliary generator and adapted to operate the two rheostats, and a solenoid having its coil in parallel with the mains adapted to coöperate in the regulation of the main generator-rheostat.

5. In means for regulating the speed and tension in an electric generating system, the combination with a main generator, a rheostat in circuit with the field-coil thereof, an auxiliary generator having two mutually counteractive field-coils, one in circuit with the mains, the other in parallel therewith, a rheostat in said parallel circuit, a motor electrically connected with said auxiliary generator and adapted to operate the two rheostats, a solenoid having its coil in parallel with the mains adapted to coöperate in the regulation of the main generator-rheostat and a tachometrical governor connected to be regulated by said motor.

6. In means for regulating the speed and tension in an electric generating system, the combination with a main generator, a rheostat in circuit with the field-coil thereof, an auxiliary generator having two mutually counteractive field-coils, one in circuit with the mains, the other in parallel therewith, a rheostat in said parallel circuit, a motor electrically connected with said auxiliary generator and adapted to operate the two rheostats, a solenoid having its coil in parallel with the mains adapted to coöperate in the regulation of the main generator-rheostat, a tachometrical governor connected to be regulated by said motor and means connecting the regulator of the prime mover to the motor.

In witness whereof I have signed this specification in the presence of two witnesses.

JOSEPH LOUIS ROUTIN.

Witnesses:
   JNO. N. BROWNE,
   SIMI FLÉCHET.